United States Patent

[11] 3,540,573

| [72] | Inventor | John K. Keim<br>1251 St. Michael St. Apt. 04, Allentown,<br>Pennsylvania 18104 |
|---|---|---|
| [21] | Appl. No. | 729,159 |
| [22] | Filed | May 15, 1968 |
| [45] | Patented | Nov. 17, 1970 |

[54] BELT CLEANER
7 Claims, 7 Drawing Figs.

| [52] | U.S. Cl. | 198/230 |
|---|---|---|
| [51] | Int. Cl. | B65g 45/00 |
| [50] | Field of Search | 198/230,<br>188, 229—231 |

[56] References Cited
UNITED STATES PATENTS

| 975,176 | 11/1910 | Stroud | 198/230 |
|---|---|---|---|
| 1,413,617 | 4/1922 | Romans | 198/230 |
| 1,479,176 | 1/1924 | Green | 198/230 |
| 2,525,348 | 10/1950 | Glass | 198/230 |
| 2,628,709 | 2/1953 | Steinmetz | 198/230 |

*Primary Examiner*—Richard E. Aegerter
*Assistant Examiner*—W. Scott Carson
*Attorney*—Frederic C. Dreyer

ABSTRACT: A belt cleaner with a ridged scraper which is reciprocated in light engagement with the belt surface and parallel to the surface. The direction of reciprocation is transverse to the direction of belt travel. The preferred form includes a circumferentially grooved roller.

Patented Nov. 17, 1970 3,540,573
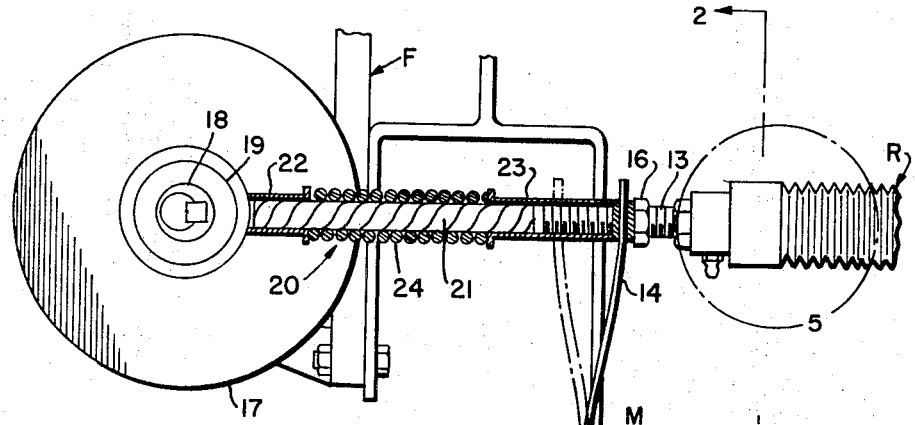
FIG. 1
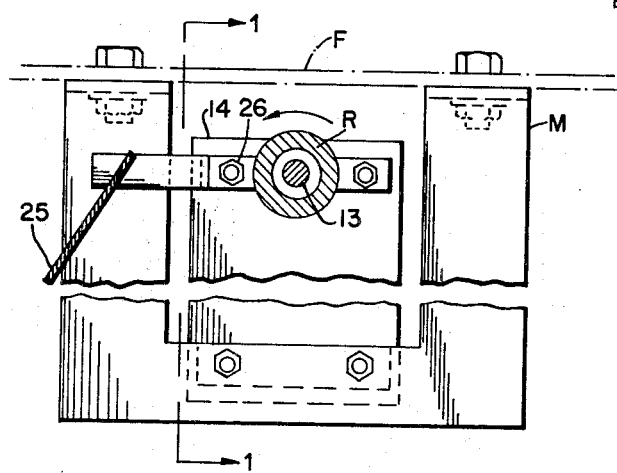
FIG. 2
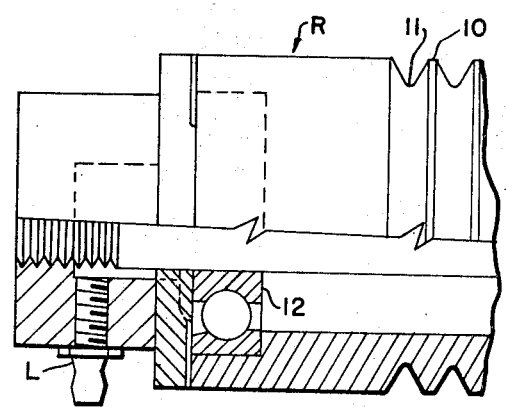
FIG. 5
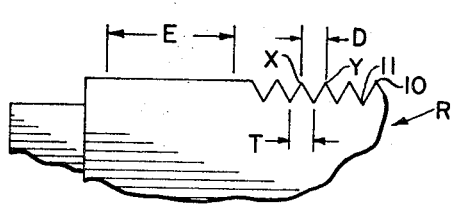
FIG. 3
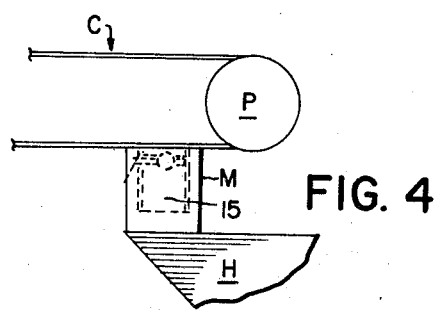
FIG. 4
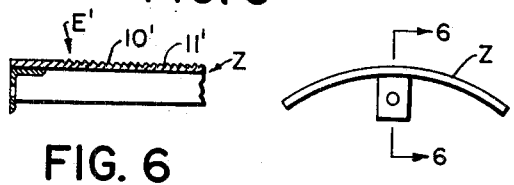
FIG. 6
FIG. 7
INVENTOR
J. KENNETH KEIM
BY Frederic C Dreyer
AGENT

BELT CLEANER

The present invention relates to belt-conveyor cleaners and is more particularly concerned with a cleaner for removing material adhering to such conveyor belts.

With many materials which are handled on belt conveyors, adhesion between the material and the belt will cause a small amount of material to be carried around with the belt beneath the load-bearing zone for the belt. Some of the material may fall off during the return run of the belt and cause a housecleaning problem along the length of the belt. With some materials, a gradual building of the material may impair the conveying capacity of the unit or cause spillage from the edges of the belt along its load-bearing run.

Prior attempts at solution of this problem have included scrapers, rotary scrapers, jarring devices and belt shakers. However, the prior devices have not been entirely satisfactory. Typically, the prior devices have exhibited a high rate of wear as a result of the abrasive character usual to most materials handled on such conveyer belts. When such wear is allowed to become pronounced, abrasion or actual cutting of the belt will occur.

In general, the preferred form of cleaner of the invention includes a scraper having raised portions on its working surface, mounting means for positioning the working surface against the surface of the belt, and reciprocating means for reciprocating the scraper substantially transversely of the length of the belt and substantially parallel to the surface of the belt.

A better understanding of the invention may be derived from the following description and the accompanying drawings in which:

FIG. I is a side view of the preferred form of belt cleaner;

FIG. II is a sectional view taken along lines II–II of FIG. I;

FIG. III is a view showing a portion of FIG. I on an enlarged scale;

FIG. IV is a side view, on a reduced scale, of the discharge end of a belt conveyor embodying the invention, and FIG. V is an enlarged view, partly cut away and similar to FIG. III;

FIG. VI is a side view of a modified form of scraper; and

FIG. VII is an end view of the scraper of FIG. VI.

As shown in FIGS. I—V, the preferred form of cleaner of the invention comprises a scraper including a roller R mounted on a mount M which is mounted on a relatively stable member, such as on the frame F of the belt conveyor C. The roller lightly engages the conveyor belt surface adjacent the discharge or head pulley P of the conveyor, at a point over the discharge hopper H.

The roller is provided with a working surface having a plurality of equally spaced, transverse ridges 10 and intermediate valleys 11 extending therealong for a length approximately equal to the expected load-carrying width of the belt surface. Since the roller is to be reciprocated transversely of the belt, it is preferable to have the roller surface substantially longer than the width of the belt, with a smooth, nonsnagging surface in the zone E which passes back and forth at the belt edge.

The roller is mounted via suitable bearings such as a pair of antifriction, thrust-type bearings 12 on a stationary shaft 13 secured on springlike arms 14 and 15, to permit transverse motion of the shaft and roller relative to the mount M. Preferably, the bearing 12 includes lubricating means L. The shaft 13 extends through the arms 14 and 15 and is locked thereon by a plurality of locknuts 16. Alternate means for permitting this transverse motion of the roller, such as rubber grommets or hinged arms, may be used, if desired.

Several forms of reciprocation mechanisms might be used to impart the transverse reciprocation desired. However, the requirements of the present invention include that of a high rate of reciprocation so that the scraping ridges extend and retract, in a complete cycle, during a very short distance of the conveyor belt travel.

The preferred reciprocation mechanism includes a motor 17, preferably mounted on the same mount M as the roller. The shaft of the motor 17 carries an eccentric disc 18 externally engaged by an anti-friction bearing 19 which is coupled to the roller shaft 13 via a coupling 20.

Preferably, the coupling 20 includes a core comprising a short length of flexible steel cable 21 which will flex only laterally and which is firmly secured to the bearing 19 and to the shaft 13, at its respective ends, by suitable sleeves 22 and 23. An encasing coil spring 24 is provided about the cable 21, fitting snugly against the outer surface of the cable to limit the lateral flexing thereof. Preferably the spring 24 is slightly compressed between the sleeves 22 and 23.

The preferred coupling 20 will accommodate any reasonable stress or misalignment transversely of its axis between the drive bearing 19, and the point of attachment to the reciprocating unit, whether as a result of the stress of the eccentric disc, initial misalignment of the unit in installation, or damage to or twisting of the unit in service.

It is to be understood that the direction of reciprocation is to be substantially transversely of the direction of belt travel, but it is not necessary that it be precisely at right angles to that direction of travel. As a matter of fact, portable belt conveyors could easily receive damage which would cause angular displacement of 10°, for example, without causing the present belt cleaner to become inoperable.

As regards the throw T of the eccentric disc 18, it is preferred that the distance D between adjacent ridges 10 on the roller be correlated with the "throw" dimension.

For example, given a throw T of one-fourth inch, a given ridge X will just meet the track point of its adjacent ridge Y (at their opposite right and left extremes of travel) if they are spaced a distance D of one-fourth inch. Therefore, it is preferred that the throw T of the eccentric 18 be at least equal to the distance D between the ridges.

Another consideration is that of packing or clogging of the valleys 11 between the ridges 10. The valleys preferably are V-shaped, to minimize this problem, while the distance D between the ridges 10 preferably substantially exceeds the dimensions of the largest of the particles susceptible to adherence to the belt. The peripheral speed of the roller will aid in clearing material from the roller surface.

For a "shelf item" design of belt cleaner which will accommodate efficiently a variety of sizes or widths of belts and materials, the following ranges of values should be adequate:

Distance D—¼" to ¾".
Throw T of eccentric—¼" to ¾".
R.p.m. of motor—1,175 to 3,495.

As an example, a unit having the following values would be satisfactory in cleaning a 36 inch wide conveyor handling coal of a particle size range of minus ⅛ inch to 1½ inches:

Distance D—⅜ inch.
Throw T of eccentric—½ inch.
R.p.m. of motor—1,770.

A deflector plate 25 is mounted via bolts 26 to the arms 14 and 15 to reciprocate therewith. The plate 25 serves to deflect material thrown from the roller. As desired, the deflector 25 may be used to deflect the removed material in any direction, either into the hopper or away from the hopper, if the adhering material is undesirable in later steps. Also, the deflector may be stationary, if desired, rather than reciprocating with the roller assembly.

As shown in FIGS. VI and VII, a modified form of scraper comprises a curved plate Z having an arcuate, grooved surface having ridges 10' and valleys 11' therein, as well as a smooth area E' similar to the smooth area of the roller R.

The scraper of FIG. V is suitable for use with low-speed conveyor belts handling relatively nonabrasive materials.

Various changes may be made in the details of the invention, as disclosed, without sacrificing the advantages thereof.

I claim:

1. A cleaner for belt conveyors comprising:
   a. a scraping member having;

b. an arcuate working surface;
c. a plurality of raised portions on the working surface;
d. mounting means for positioning the working surface on the surface of the belt to be cleaned; and
e. means for reciprocating the working surface substantially transversely of the length of the belt and substantially parallel to the belt surface.

2. A cleaner according to claim 1 in which the raised portions comprise ridges substantially parallel to the direction of travel of the belt.

3. A cleaner according to claim 2 in which the distance between the ridges is smaller than the throw distance of the reciprocating means.

4. A cleaner according to claim 2 in which a portion adjacent each end of the working surface is smooth.

5. A cleaner according to claim 1 in which the scraping member comprises a roller.

6. A cleaner according to claim 2 in which the scraping member comprises a roller, and in which the ridges are formed between V-shaped circumferential grooves.

7. A cleaner according to claim 6 including a deflector plate positioned to engage material thrown from the periphery of the roller.